(12) United States Patent
Chen et al.

(10) Patent No.: US 6,374,265 B1
(45) Date of Patent: Apr. 16, 2002

(54) METHOD FOR BACKUP AND RECOVERY OF THE LONG FILENAME IN COMPUTER SYSTEM

(75) Inventors: Hsuan-Tung Chen; Kuang-Shih Lin, both of Taipei (TW); Chun Liu, Tianjin (CN)

(73) Assignee: Inventec Corp., Taipei (TW)

( * ) Notice: Subject to any disclaimer, the term of this patent is extended or adjusted under 35 U.S.C. 154(b) by 0 days.

(21) Appl. No.: 09/280,901

(22) Filed: Mar. 29, 1999

(51) Int. Cl.[7] .............................................. G06F 12/00
(52) U.S. Cl. ........................ 707/204; 707/202; 707/205
(58) Field of Search .............................. 707/201, 202, 707/203, 204, 205

(56) References Cited

U.S. PATENT DOCUMENTS

| 5,371,885 A | * | 12/1994 | Letwin | 707/205 |
|---|---|---|---|---|
| 5,485,606 A | * | 1/1996 | Midgdey et al. | 707/204 |
| 5,603,020 A | * | 2/1997 | Hashimoto et al. | 707/200 |
| 5,608,901 A | * | 3/1997 | Letwin | 707/202 |
| 5,742,817 A | * | 4/1998 | Pinkoski | 707/200 |
| 5,754,848 A | * | 5/1998 | Hanes | 707/202 |
| 5,765,169 A | * | 6/1998 | Conner | 707/200 |
| 5,926,805 A | * | 7/1999 | Hurvig et al. | 707/200 |
| 6,101,585 A | * | 8/2000 | Brown et al. | 707/204 |
| 6,173,291 B1 | * | 1/2001 | Jenevein | 707/202 |
| 6,233,105 B1 | * | 5/2001 | Chen et al. | 707/205 |

* cited by examiner

*Primary Examiner*—Hosain T. Alam
*Assistant Examiner*—Anh Ly
(74) *Attorney, Agent, or Firm*—W. Wayne Liauh (57) ABSTRACT

This invention discloses a method for backup and recovery of the long filename in the computer system (e.g., DOS) that not support the long filename. The technique of the backup operation of this invention is to read the file directory table (FDT) from the logic partition of the hard disk by calling the basic input output system (BIOS) function; then transfer the long filename and short filename items into long filename format and saving to a backup file. Alternatively, recovering the backup is to search the short filename of each directory and sub directory and obtaining the data in the back up file; then write the matched long filename back to the original FDT.

4 Claims, 12 Drawing Sheets

METHOD FOR BACKUP AND RECOVERY OF THE LONG FILENAME IN COMPUTER SYSTEM

BACKGROUND OF THE INVENTION

This invention relates to a computer system, and more particularly to a method for backup and recovery of the long filename under the computer system (e.g. DOS operation system) that does not support the long filename designation.

In Microsoft Win95 and sequential Windows operation system, one of the useful improvements is enabling the possibilities for designation of long filename. It releases users from the restrict of eight characters filename. However, the prior operation system (e.g. Win 31 and DOS) does not support the long filename designation. In order to be compatible with DOS, the Win95 system creates a short filename to access the corresponding file under the non-supporting system. But the DOS 7.0 of Win95 still cannot create the long filename if Win95 does not start. It is necessary to create the long filename in many conditions such as in the condition of the backup and recovery of operation system under the DOS.

In the real world of computer operation the crash of the operation system happens. Once the user who did not back up the operation system has to reinstall it when it is crashed. Nevertheless, reinstalling the operation system is a complicate problem, so it is necessary to back up the operation system previously to avoid the inconvenience.

SUMMARY OF INVENTION

It is an object of this invention to provide a method for backup and recovery of the long filename under the computer system that does not support the long filename designation.

It is another object of this invention to provide a method for backup and recovery of the long filename in the computer system free from language restriction.

It is still another object of this invention to provide a method for backup and recovery of the long filename under the circumstance that the computer system can not start.

The technique of this invention is to read the file directory table (FDT) from the logic partition of the hard disk by calling the basic input output system (BIOS) function, then transfer the long filename and short filename items into long filename format and write to a backup file. The backup file will be reversed under the environment that does not support the long filename. First, search the short filename of each directory and sub directory and obtain the data in the back up file. After that, write the matched long filename back to the original FDT to avoid the limitation of DOS that does not support the long filename designation.

In accordance with the above-mentioned objects, this invention discloses the method that can back up and recover the long filename when Windows system is not able to start. That is, it can work under any language system that the operation system belongs. For example, it can back up and recover the long filename of Win95 traditional Chinese version in Win95 simplified Chinese version.

BRIEF DESCRIPTION OF THE DRAWINGS

The objectives and advantages of the present invention will become apparent from a detailed description provided below, with reference to the accompanying drawings.

DETAIL DESCRIPTION OF THE PREFERRED EMBODIMENT

Figure 1:
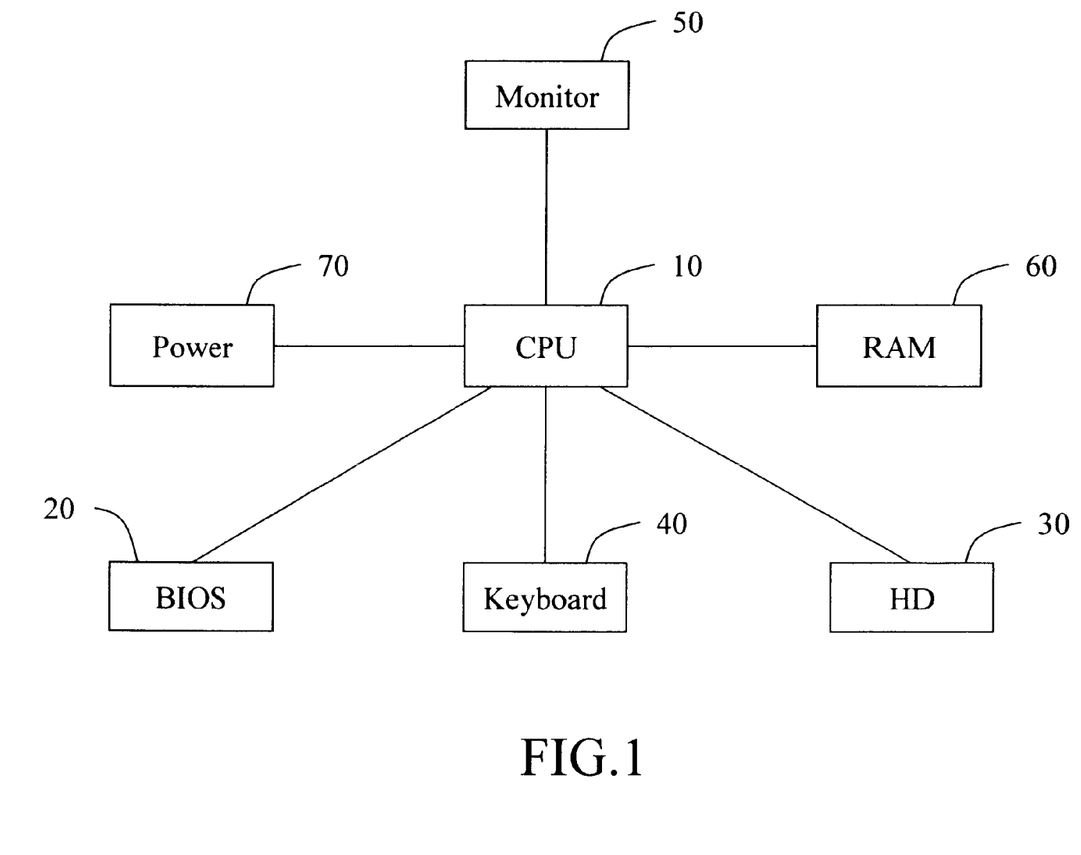
FIG. 1 is the block diagrams of the computer hardware construction of the present invention.

The invention of backup and recovery of the long filename under the computer system that does not support the long filename is carrying out by the hardware construction shown in FIG. 1, which includes a central processing unit (CPU) 10, a basic input/output system (BIOS) 20, a hard disk 30, an input unit 40, an output unit 50, a random access memory module (RAM) 60 and a power supply 70. CPU 10 executes the processes of backup and recovery operation. Hard disk 30 stores operation system, application programs or files for the usage of CPU 10. Input unit 40 includes the keyboard, mouse, optical reader or other peripheral equipment for inputting data to the system. Output unit 50 includes the screen, monitor or other peripheral equipment for outputting the result of CPU 10 operation. RAM 60 stores the temporary data and power supply 70 provides power for the system.

The technique of the present invention for backup and recovery the long filename includes two steps of:

1. Back up the long filename as a long filename backup file; and
2. Reversing the backup file to recover the long filename.

Before describing the two steps in detail, a brief introduction will be provided about the information of the long filename and short filename.

Data Structure of Disk Drive

Figure 2:
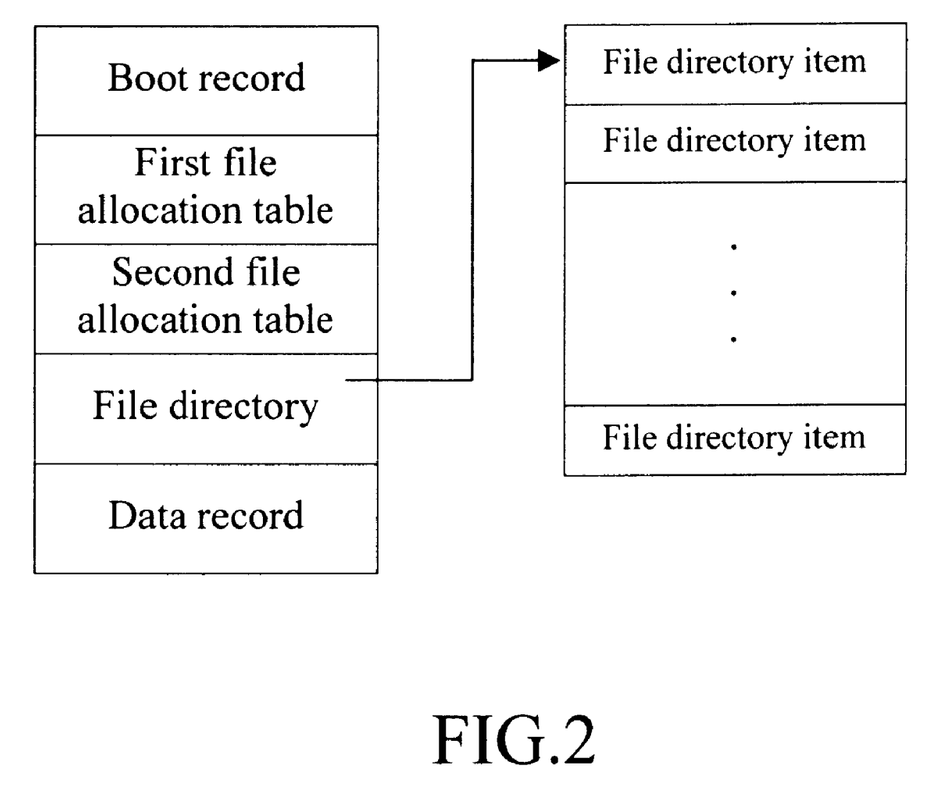
FIG. 2 is the block diagrams of the data structure of disk partition.

Disk drive such as hard disk is one of the peripherals of the computer for storing operation system, application programs, digital data, analog data and etc. No matter hard disk or floppy disk, all need to make an initialization process called formatting before being used. Currently, it is executed by the command "format" that Microsoft's computer system provides. The formatting process divides the diskette to sectors that construct tracks; then assigns numbers to every sectors and tracks, and writes the information of sectors and tracks into the file allocation table (FAT) and FDT which are built in advance. Referring to FIG. 2, which depicts the structure block diagram of the disk partition, includes a boot record, first FAT, second FAT, a file directory region and a data storage region. Actually, the file directory and data storage regions are the content of the FDT. Where file directory region consists of many file directory items (including short filename items and long filename items) for providing and storing the information of the data in the data record region (e.g. filename, extend filename, time and etc.).

There is a disk parameter block (DPB) in the boot record which is different between FAT 16 format and FAT 32 format as shown in table 1 and table 2 respectively.

TABLE 1

DPB structures of FAT16 format

| Location | Contents |
|---|---|
| 0B–0C | Bytes per sector (0 × 0002 = 512) |
| 0D | Sectors per cluster (decided by size of partition) |
| 0E–0F | Reserved (0 × 0100) |
| 10 | Number of FAT (0 × 02) |
| 11–12 | Maximum number of file directory items (0 × 0002) |
| 13–14 | Total sectors (0, maximum is 65535) |
| 15 | Media description code (0 × 18) |
| 16–17 | Sectors per FAT (equation 1) |
| 18–19 | Sectors per track |
| 1A–1B | Head number |
| 1C–1D | Hidden sectors (no influence to the result) |
| 20–23 | Total sector number if byte 13–14 is 0 |
| 24 | Physical drive number (first = 0 × 80, second = 0 × 81) |
| 25 | Reserved |
| 26 | Characteristic byte of extension index record (0 × 29) |
| 27–2A | Serial number of disk (generated randomly) |
| 2B–35 | Label (11 bytes) |
| 36–3D | File system type (FAT16) |

TABLE 2

DPB structures of FAT32 format

| Location | Contents |
|---|---|
| 0B–0C | Bytes per sector (0 × 0002 = 512) |
| 0D | Sectors per cluster (decided by size of partition) |
| 0E–0F | Reserved (0 × 0100) |
| 10 | Number of FAT (0 × 02) |
| 11–12 | Maximum number of file directory items (0) |
| 13–14 | Total sectors (0) |
| 15 | Media description code (0 × f8) |
| 16–17 | Sectors per FAT (0) |
| 18–19 | Sectors per track |
| 1A–1B | Head number |
| 1C–1F | Hidden sectors (no influence to the result) |
| 20–23 | Total sector number if byte 13–14 is 0 |
| 24–27 | Sector per FAT (equation 2) |
| 28–29 | File system Ver. (major) (0) |
| 2A–2B | File system Ver. (minor) (0) |
| 2C–2D | Number of file director's first cluster (0 × 02000) |
| 2E–2F | High bytes of the file director's first cluster |
| 30–31 | FSINFO Sector number (0 × ffff if not exist) |
| 32–33 | Backup boot sectors (0 × ffff if not exist) |
| 34–3F | Reserved |
| 40 | Physical drive number (first = 0 × 80, second = 0 × 81) |
| 41 | Reserved |
| 42 | Characteristic byte of extension index record (0 × 29) |
| 43–46 | Serial number of disk (generated randomly) |
| 47–51 | Label (11 bytes) |
| 52–59 | File system type (FAT32) |

The structure of the short filename and long filename item of FDT are shown in table 3.

TABLE 3

Long/short filename structures of FDT

Long filename item (including ending mark)
Long filename item
.
.
.
Long filename item
Short filename item Data Structure of Long Filename Item and Short Filename Item In Win95 system, there is a method for storing long filenames with directory items of 8.3 format (short filename format). Microsoft calls it as virtual file allocation table (VFAT). Every file that stores VFAT system has a relative 8.3 format alias storing in the same FDT. Every FDT consists many file directory items (including short filename directory item and long filename directory item). Every long filename directory item stores 13 characters of the long filename in "unicode" format. Every character uses two bits. In order to distinguish between long filename and short filename in FDT, Microsoft Win95 sets the attribute of long filename as 0F. Since 0F is an illegal filename and cannot be accessed in DOS, the long-name file is protected from being deleted or renamed by DOS but DOS can access the short-name file.

Table 4 and table 5 show the format of the long and short filename directory items respectively.

TABLE 4

Format of long filename directory item

| Offset | length | Description |
|---|---|---|
| 00H | 1 byte | Bit 0~bit 5 are the address of directory item respect to short filename, bit 6 is an ending mark |
| 01H | 10 bytes | Including 5 characters of long filename |
| 0BH | 1 byte | Attribute, 0FH in long filename |
| 0CH | 1 byte | Reserved |
| 0DH | 1 byte | Checking sum of short filename |
| 0EH | 12 bytes | Including 6 characters of long filename |
| 1AH | 1 word | Reserved (always 0) |
| 1CH | 4 bytes | Including 2 characters of long filename |

TABLE 5

Format of long filename directory items

| offset | length | Description |
|---|---|---|
| 00H | 8 bytes | Filename |
| 08H | 3 bytes | Extension filename |
| 0BH | 1 byte | attribute |
| 0CH | 1 word | Reserved. |
| 0EH | 1 word | Last access time |
| 10H | 1 word | Last update time |
| 12H | 1 word | Last update date |
| 14H | 1 word | High 2 bytes of FAT 32 start clusters |
| 16H | 1 word | Last update time |
| 18H | 1 word | Last update date |
| 1AH | 1 word | Start cluster of FAT 16 or low 2 bytes of FAT 32 start cluster |
| 1CH | 1 word | File size |

For example, there is a file in long filename formatted as "RunOnceLog.txt" and in short filename formatted as "RUNONC~1.TXT", it stores in forms as follows

```
1370:04E0  42 2E 00 74 00 78 00 74- 00 00 00 0F 00 D0 FF FF    B..t.x.t........
1370:04F0  FF FF FF FF FF FF FF-FF FF FF 00 00 FF FF FF FF    ................
1370:0500  01 52 00 75 00 6E 00 4F-00 6E 00 0F 00 D0 63 00    .R.u.n.O.n....c.
1370:0510  65 00 45 00 78 00 20 00 -4C 00 00 00 6F 00 67 00   e.E.x..L...o.g.
1370:0520  52 55 4E 4F 4E 43 7E 31-54 58 54 20 00 15 2B 6D    RUNONE~1TXT.. +m
1370:0530  67 25 67 25 00 00 16 72-65 25 14 00 B3 45 00 00    g%g%...re%...E..
```

From 1370:04E0 to 1370:04FF, 32 bytes are long filename rear item.

From 1370:0500 to 1370:051F, 32 bytes are long filename item.

From 1370:0520 to 1370:053F, 32 bytes are short filename directory item.

Windows can check whether the short filename was modified under non-Win9x environment by calculating the checksum of short filename and comparing with the checksum data in the long filename item.

According to the technique disclosed in the present invention, all we need is to back up the long filename item and corresponding short filename of the file directory region into a backup file. Then we can use the backup file to recover the long filename by finding the corresponding short filename in the backup file and obtaining the long filename from the backup file writing back to the file directory region of the disk.

Figure 3:
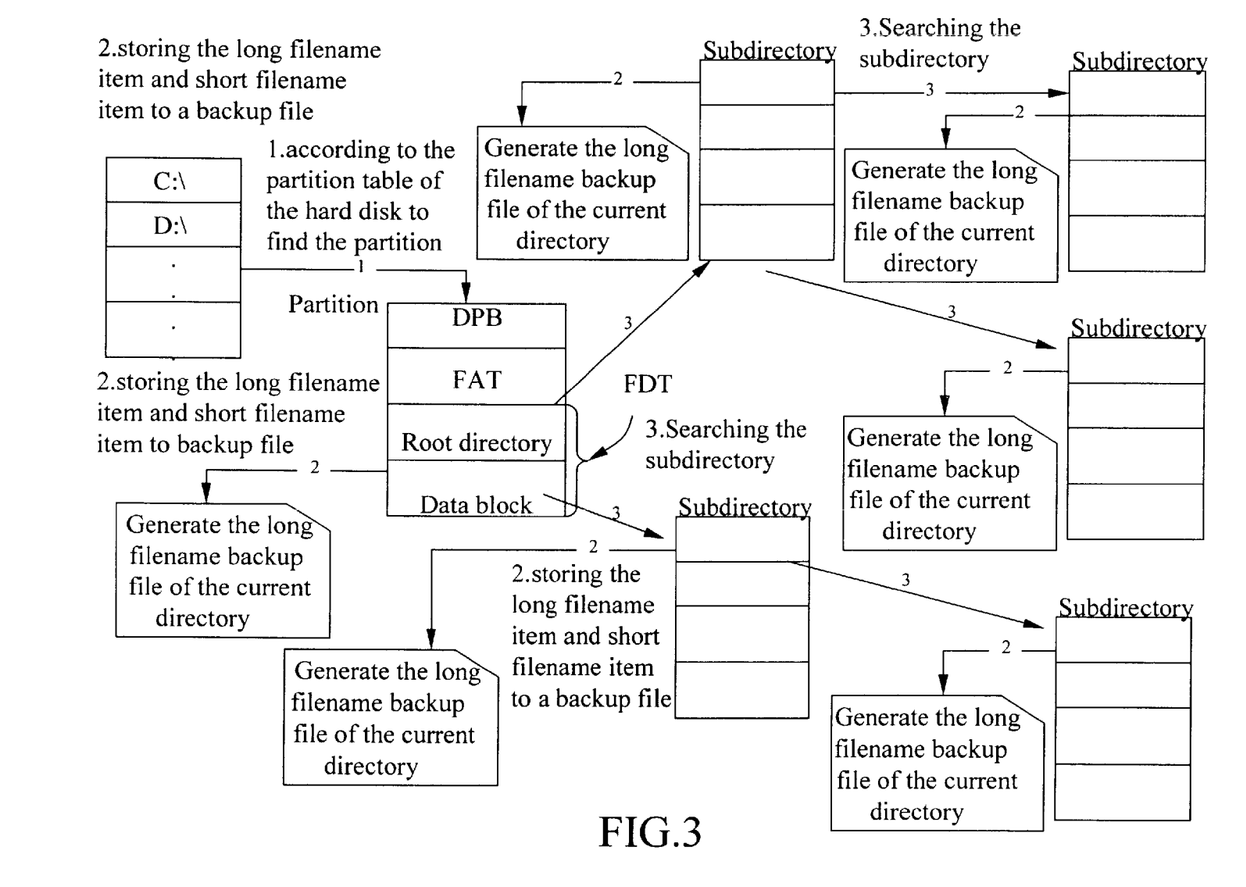
FIG. 3 is the flowchart of the long filename backup operation of the present invention.

Referring to FIG. 3, the long filename backup operation flow of the present invention includes the steps of:

1. Obtaining the first sector of partition (i.e., the DPB) of the hard disk 30 according to the partition table.
2. Storing the long filename item and short filename item of the FDT into the current directory as a long filename backup file.
3. Search the FDT of the subdirectories.
4. Storing the long filename item and short filename item of the FDT of subdirectories into the current subdirectory as a long filename backup file.
5. Checking whether other subdirectories have not been backed up; if the answer is yes, going back to step 4; otherwise, finishing the operation.

Figure 5:
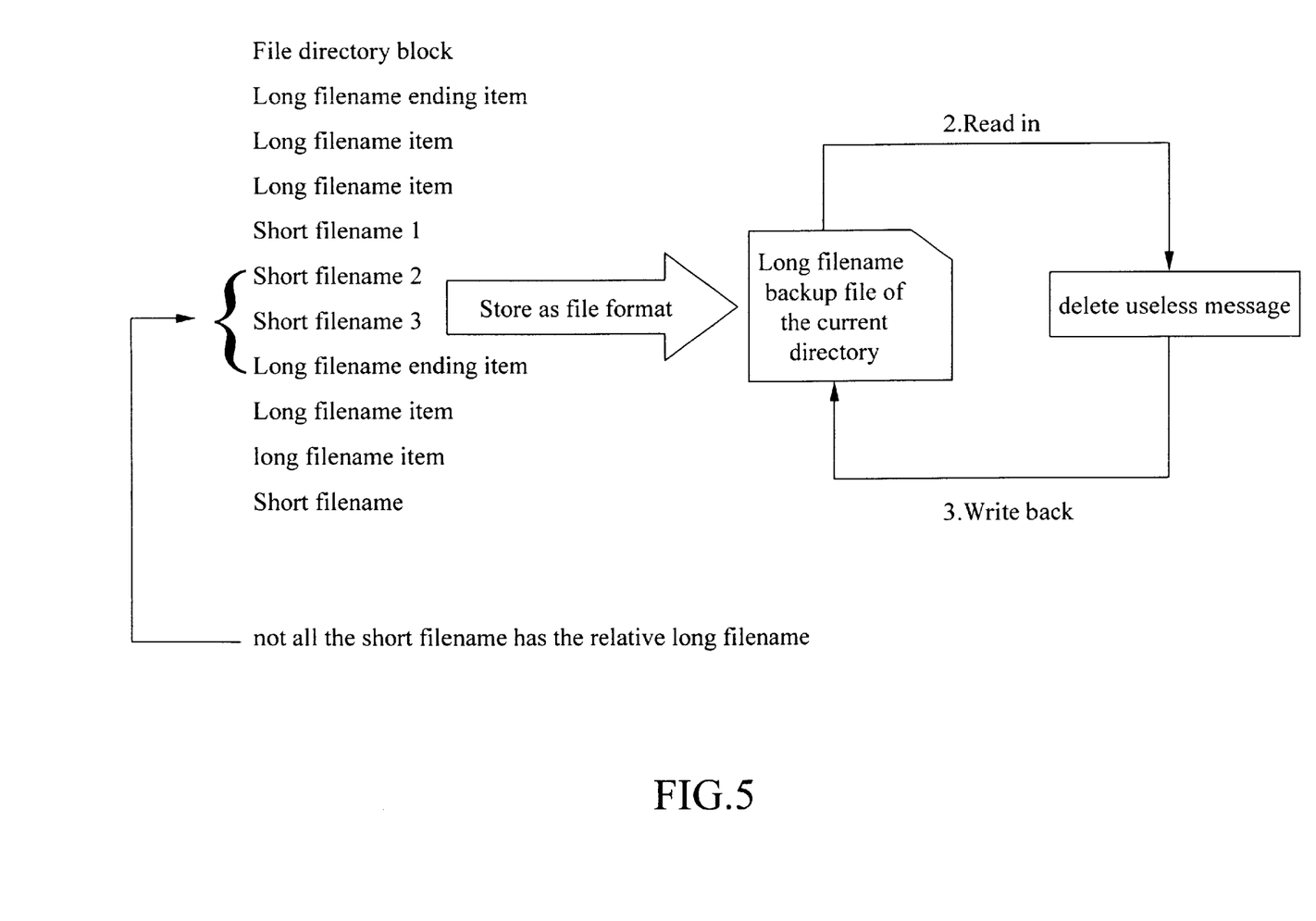
FIG. 5 is the flowchart of creating the long filename backup file of a particular directory of the present invention.

With reference to FIG. 5, since there may be short filenames in the same FDT such as shortname1~shortname3 of FIG. 5, they have no corresponding long filenames. The short filename items of those short filenames are useless in the long filename recovery process. Therefore, after the backup file was created, the short filename that has no corresponding long filename item existed will be eliminated.

Figure 7:
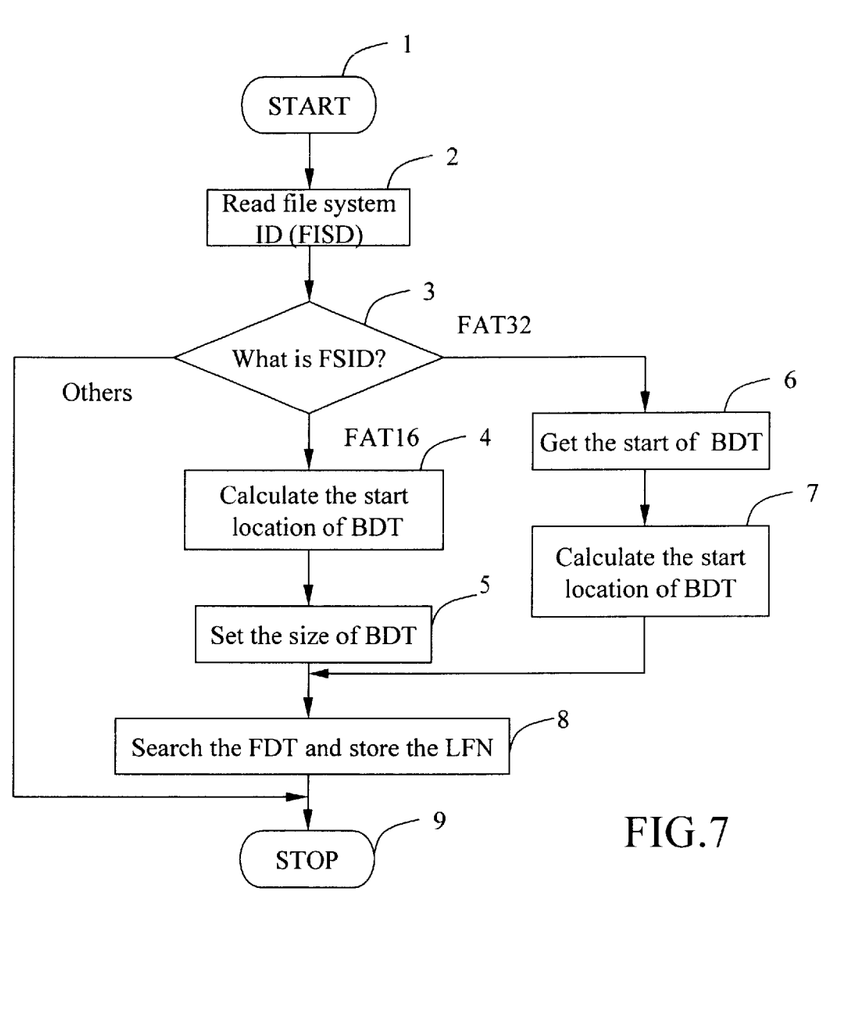
FIG. 7 is the major process flowchart of the long filename backup operation of the present invention.

Referring to FIG. 7, the main process to back up the long filename of this invention includes the steps of:

1. Starting to back up long filenames of the FDT.
2. Reading the DPB data of the hard disk that is backed up to get the file system ID (FSID).
3. According to FSID, if the disk partition is FAT 16, going to step 4; if disk partition is FAT 32, going to step 6; otherwise, going to step 9.
4. Calculating the location of boot directory table (BDT).
5. Setting the size of BDT including disk capacity and cluster.
6. Obtaining the start point of BDT.
7. Calculating the BDT start location.
8. Searching each FDT and creating the long filename backup file in the current directory.
9. Finishing the backup process.

The technique of process in FIG. 7 is followed by by searching and obtaining the root directory location according to the partition table of the disk drive. It is the first sector after the FAT for FAT 16 system, and normally the second cluster for FAT 32 system. In the case of FAT 32 system, the root directory location can also be read from DPB. After the root directory location was found, the backup of the long filename of the root directory and subdirectories can be proceeded.

Figure 8:
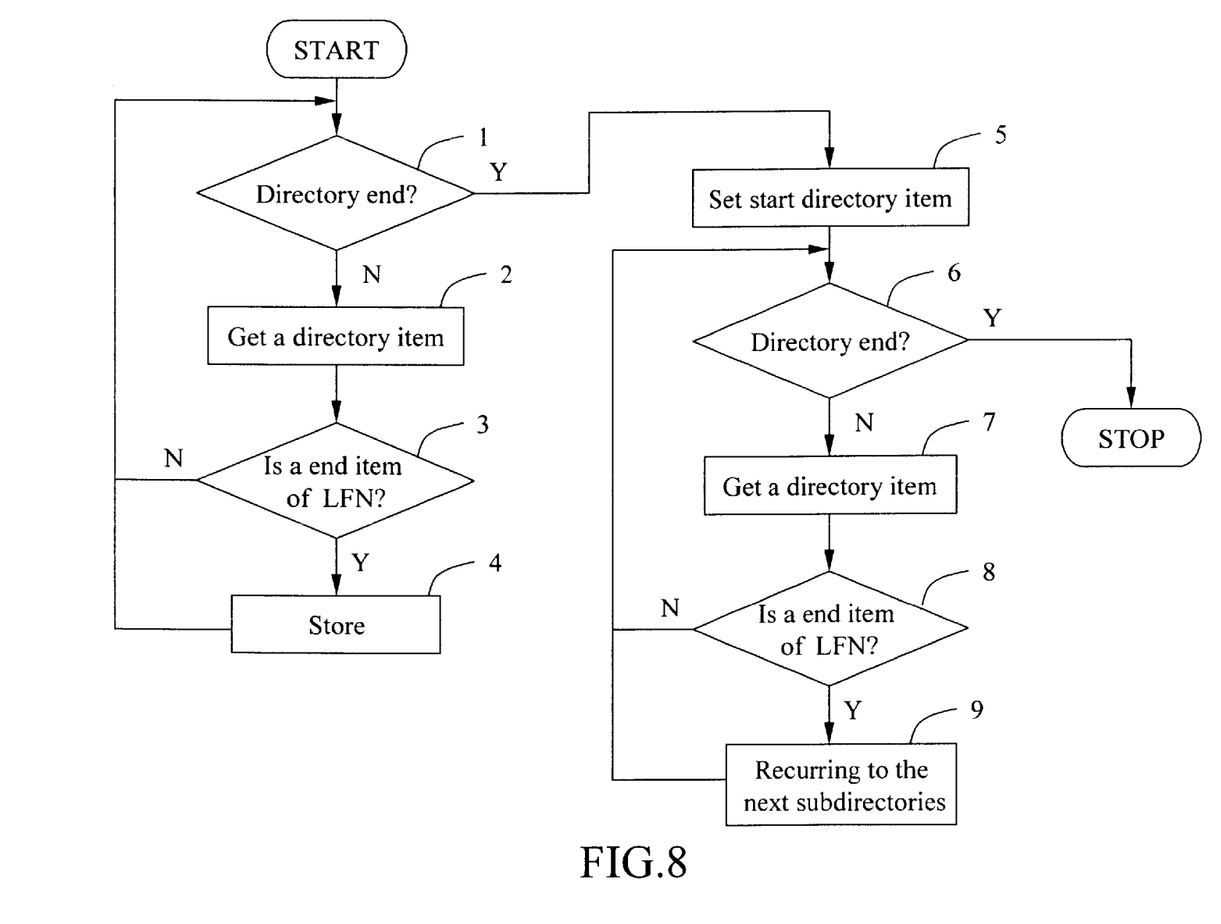
FIG. 8 is the partial flowchart of FIG. 7, showing the detail steps of searching and creating the long filename backup file of the FDT.

Referring to FIG. 8, the detail process of step 8 in FIG. 7 includes the steps of:

1. Checking whether the backup operation of current directory is finished? If the answer is yes, going to step 5, otherwise, going to next step.
2. Reading a filename item and write to the long filename backup file in the current directory.
3. Checking whether the file directory item is the ending item of long filename? If the answer is yes, going to next step, otherwise, going back to step 1.
4. Saving the backup file under the current directory as a backup document then going back to step 1.
5. Setting the starting directory as the current directory
6. Checking whether the backup operation of current directory is finished? If the answer is yes, stopping the long filename backup operation, otherwise, going to next step.
7. Reading filename item and writing it to the long filename backup file in the current directory.
8. Checking whether the file directory item is a subdirectory? If the answer is yes, going to next step, otherwise, going back to step 6.
9. Proceeding the next subdirectory in a recursive manner, then going back to step 6.

The method to search FDT and backup the long filename in FIG. 8 is by two-pass searching method. First, analyze and keep every long filename item and corresponding short filename item of every sector in the first pass. Next, analyze and keep every long filename item and corresponding short filename item of every subdirectory in the second pass.

Since this invention uses the recursive method, it was counted that we can manage the subdirectory deep to 40 levels for both FAT 16 system and FAT 32 system. Further more, if the current directory is not kept, it can be increase to 80 levels.

Operation Process for Recovering the Long Filename

Figure 4:
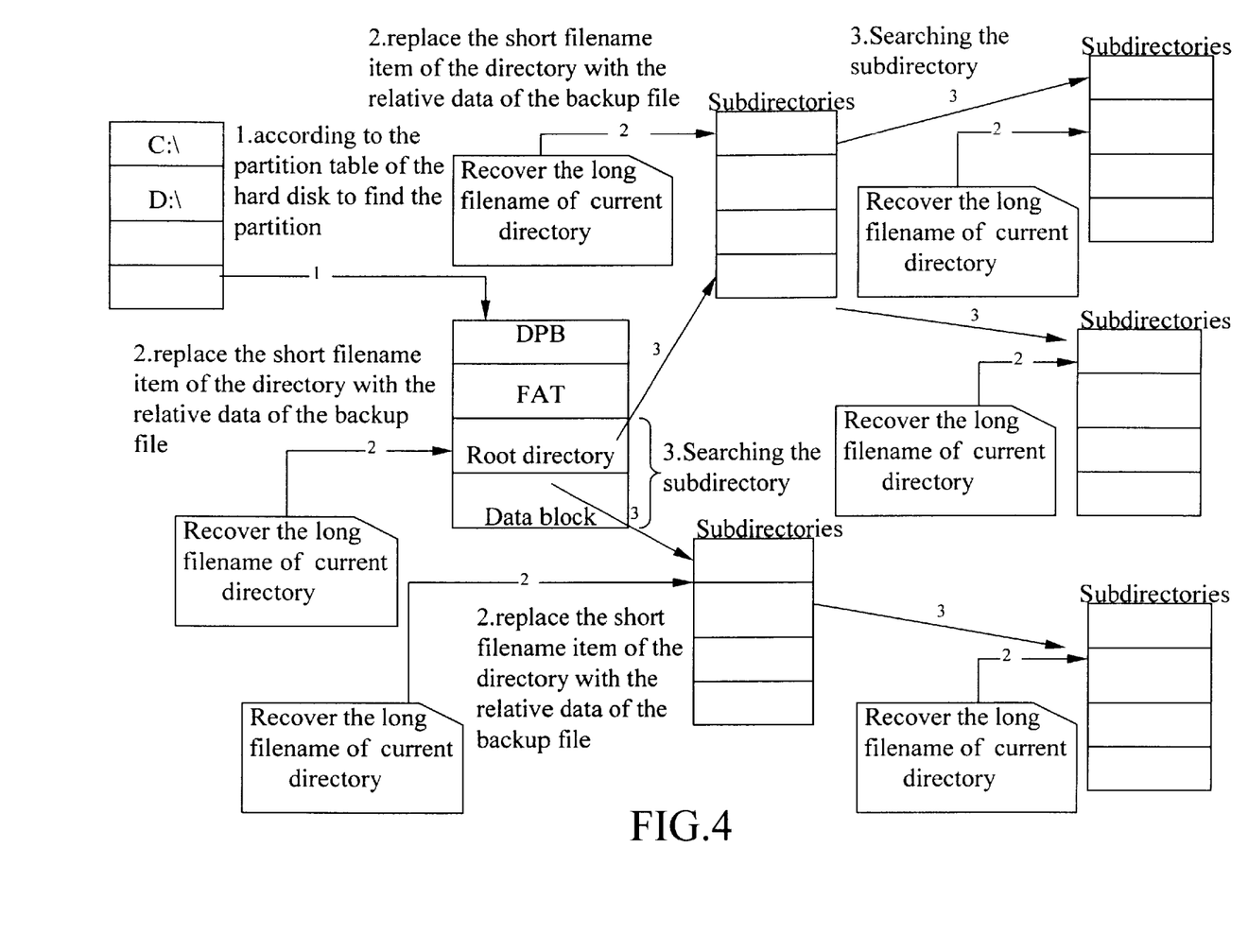
FIG. 4 is the flowchart of long filename recovery operation of the present invention.
Figure 6:
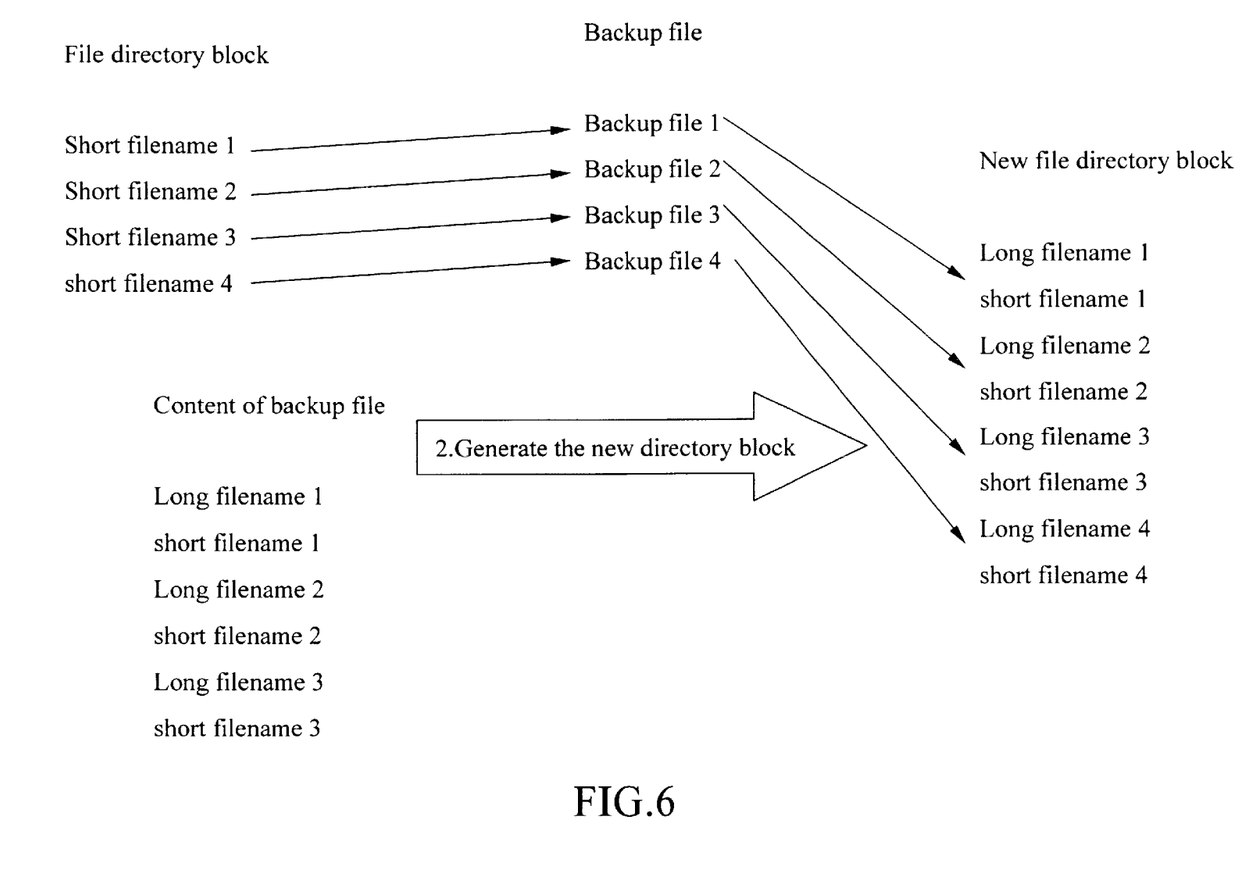
FIG. 6 is the flowchart of recovering the long filename of the present invention.

FIG. 4 is the procedures for using the long filename backup file to recover the long filename of the disk drive. Basically, it is the reverse operation of backup operation, which includes the steps of:

1. Searching the first sector (i.e., the DPB) of the hard disk 30 according to the partition table.
2. Obtaining the corresponding data including the short filename item and the long filename item in the long filename backup file according to short filename items in the FDT of the partition. Then replacing the corresponding short file name item of the FDT of the current directory with the data read from the backup file including short filename item and long filename item. Thus, the data of the FDT becomes a new file directory item (see FIG. 6).

3. Searching the FDT of the subdirectories.

4. Obtaining the corresponding data including short filename item and long filename item in the long filename backup file according to short filename items of the FDT in the subdirectory. Then replacing the corresponding short file name item of the FDT of the current directory with the data read from the backup file including short filename item and long filename item. Thus, the data of the FDT become a new file directory item (see FIG. 4).

5. Checking whether there are subdirectories that have not completed the recovery process. If the answer is yes, going back to step 4, otherwise, finishing the recovery process.

Figure 9:
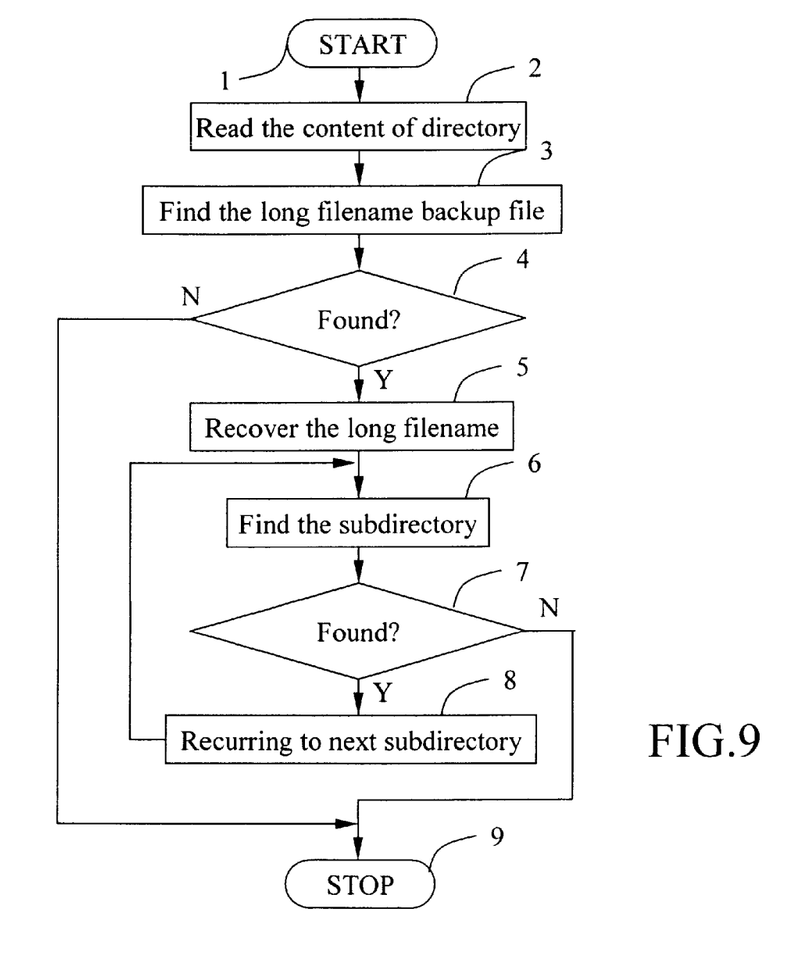
FIG. 9 is the major process flowchart of recovering the long filename of the present invention.

With reference to FIG. 9, the main process to recover the long filename of this invention includes the steps of:

1. Starting to recover the long filename of the FDT.

2. Reading the FDT data of the hard disk that is recovered.

3. Obtaining the long filename backup file in the current directory.

4. Checking whether the long filename backup file is obtained. If the answer is yes, going to next step, otherwise, going to step 9.

5. Recovering the long filename. Obtaining corresponding data including short filename item and long filename item in the long filename backup file according to the short filename item of the current FDT. Then replacing the corresponding short file name item of the FDT of the current directory with the data read from the backup file including short filename item and long filename item. Thus, the data of the FDT become a new file directory item.

6. Obtaining the subdirectory of current directory.

7. Checking whether there are sub-directories? If the answer is yes, going to next step, otherwise, going to step 9;

8. Recovering the long filename of current subdirectory, then going back to step 6 to recurring other subdirectories.

9. Finishing the recovery process.

It is similarly that the technique of process in FIG. 9 is by searching and obtaining the root directory location according to the partition table of the disk drive. For FAT 16 system, it is the first sector after the FAT, and normally the second cluster for FAT 32 system. In the case of FAT 32 system, the root directory location can also be read from DPB. After the root directory location was obtained, the short filename item of the root directory and subdirectories can be replaced with a new file directory item including short filename item and long filename item.

Figure 10:
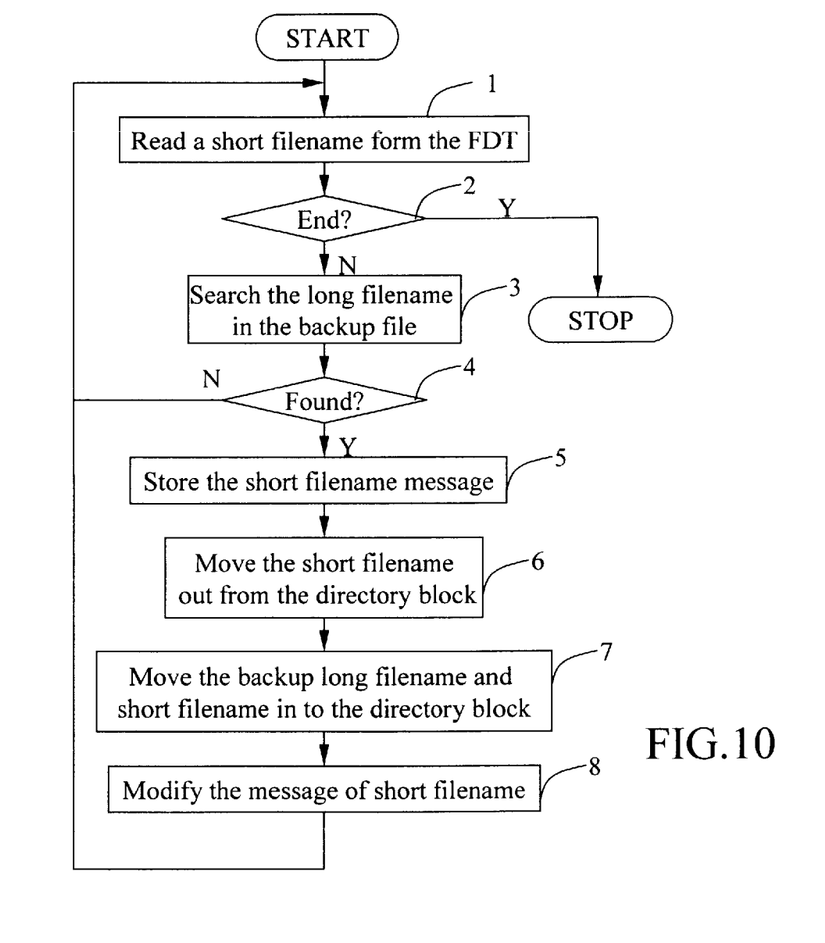
FIG. 10 is the partial flowchart of FIG. 7, showing the detail steps of searching and recovering the long filename of the FDT.

Referring to FIG. 10, the method for recovery of the long filename in FIG. 9 includes the steps of:

1. Reading a short filename item from the current directory.

2. Checking whether the long filename recovery process is finished? If the answer is yes, finishing the operation, otherwise, going to step 3.

3. Obtaining the long filename backup file.

4. Checking whether the backup file is obtained? If the answer is yes, going to next step, otherwise, going back to step 1.

5. Storing the short filename item data temporally.

6. Deleting the short filename item.

7. Moving the data that has the same short filename item and corresponding long filename item from the long filename backup file to FDT.

8. Modifying the pointer of the short filename item to point to the first cluster of the file, making it the same as the pointer of the short filename item that was stored temporally in step 5 and deleted in step 6.

Figure 11:
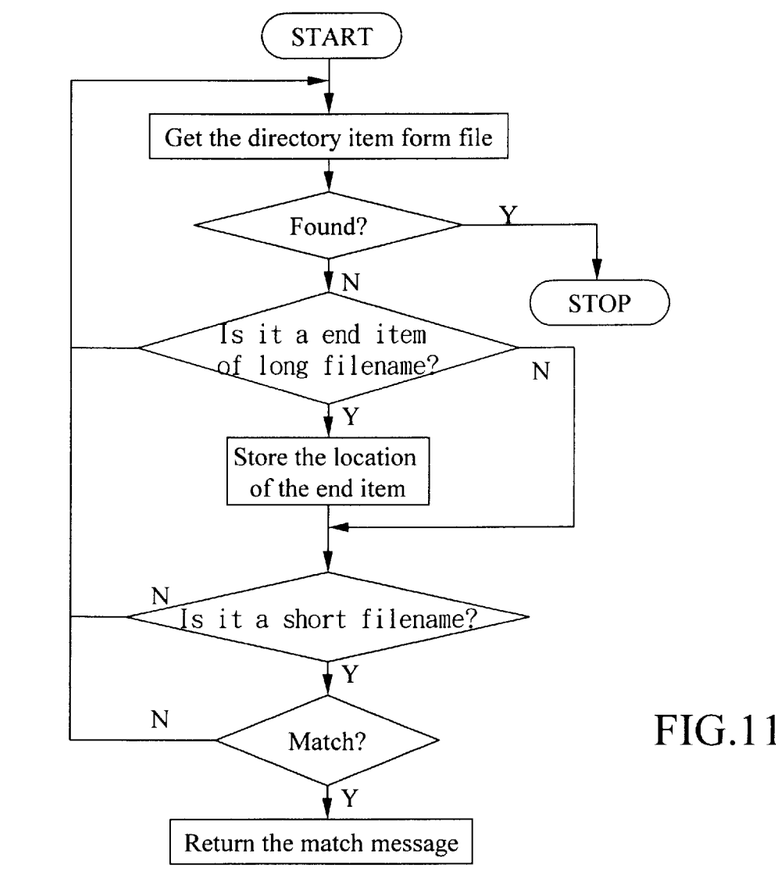
FIG. 11 is the detail process flowchart of searching the long filename from the backup file.
Figure 12:
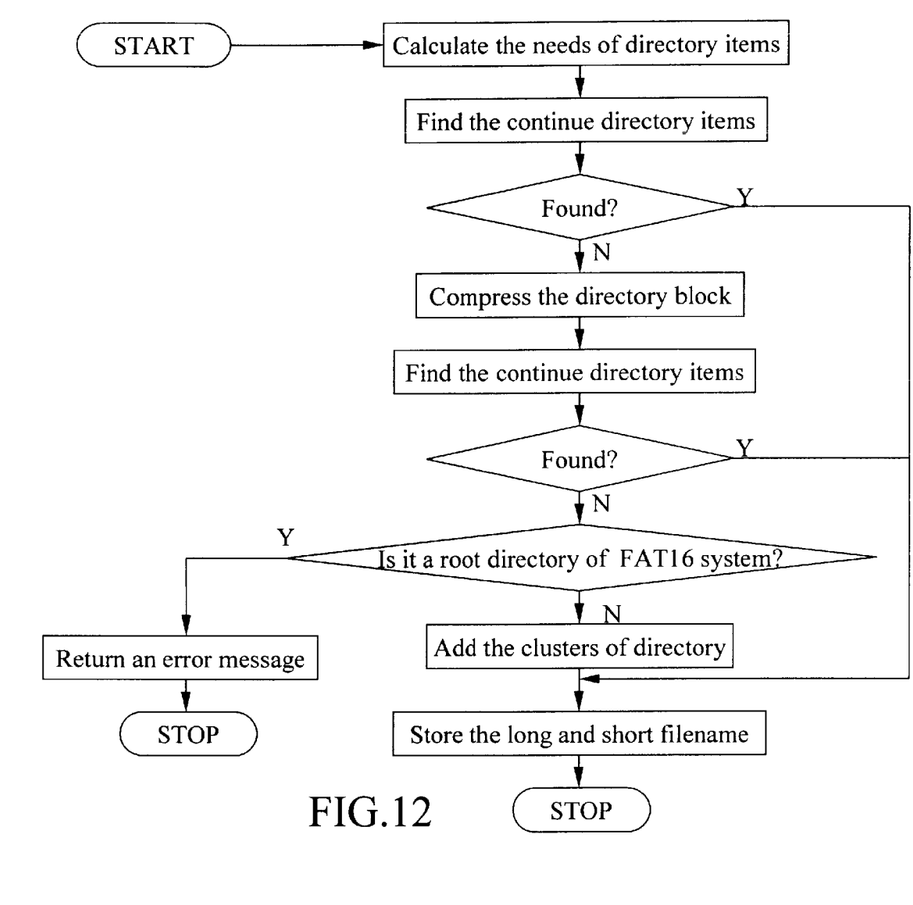
FIG. 12 is the detail process flowchart of writing the content of the backup file to the FDT.

The technique of recovery operation process in FIG. 10 is by obtaining a short filename and searching the corresponding long filename item in the long filename backup file of the current directory (see FIG. 11). If the short filename is obtained, the file directory block thereof will be deleted. The short filename item and corresponding long filename item will be added into file directory block, then the pointer of the short filename item will be modified to point to the first cluster of the file, making it the same as the pointer of the short filename item.

Table 6 is an application of the present invention. It shows the contents of the same directory in the conditions before backup, after system is crashed and after the recovery process by the method of this invention.

The example shows that by the method of this invention, we can recover the file directory from the condition of only short filename left back to what it was before system crashed after system is crashed.

TABLE 6

Example of this invention

Three long filename in the directory before backup are as follow:

| | | |
|---|---|---|
| 1370:0460 | 42 4C 41 43 4B 54 7E 31-42 4D 50 20 00 0F 2B 6D | BLACKT~1BMP..+m |
| 1370:0470 | 67 25 67 25 00 00 20 A0-AB 24 0D 00 B6 00 00 00 | G%g%....$... |
| 1370:0480 | 42 6E 00 20 00 53 00 61-00 76 00 0F 60 6B 65 00 | Bn..S.a.v...ke. |
| 1370:0490 | 72 00 2E 00 53 00 43 00-52 00 00 00 00 00 FF FF | r...S.C.R... |
| 1370:04A0 | 01 43 00 68 00 61 00 6E-00 6E 00 0F 00 6B 65 00 | .C.h.a.n.n...ke. |
| 1370:04B0 | 6C 00 20 00 53 00 63 00-72 00 00 00 65 00 65 00 | l..S.c.r...e.e. |
| 1370:04C0 | 43 48 41 4E 4E 45 7E 31-53 43 52 20 00 10 2B 6D | CHANNE~1SCR..+m |
| 1370:04D0 | 67 25 67 25 00 00 20 A0-AB 24 0E 00 40 48 01 00 | g%g%....$..@H.. |
| 1370:04E0 | 42 2E 00 74 00 78 00 74-00 00 00 0F 00 D0 FF FF | B..t.x.t... |
| 1370:04F0 | FF FF FF FF FF FF FF FF-FF FF 00 00 FF FF FF FF | ................ |
| 1370:0500 | 01 52 00 75 00 6E 00 4F-00 6E 00 0F 00 D0 63 00 | .R.u.n.O.n....c. |
| 1370:0510 | 65 00 45 00 78 00 20 00-4C 00 00 00 6F 00 67 00 | e.E.x..L...o.g. |

TABLE 6-continued

Example of this invention

| | | |
|---|---|---|
| 1370:0520 | 52 55 4E 4F 43 7E 31-54 58 54 20 00 15 2B 6D | RUNONC~1TXT..+m |
| 1370:0530 | 67 25 67 25 00 00 16 72-65 25 14 00 B3 45 00 00 | G%g%...re%...E.. |
| 1370:0540 | 42 69 00 66 00 00 00 00-FF-FF FF FF 0F 00 23 FF FF | Bi.f.....#.. |
| 1370:0550 | FF FF FF FF FF FF FF FF-FF FF 00 00 FF FF FF FF | ............... |
| 1370:0560 | 01 45 00 78 00 69 00 74-00 20 00 0F 00 23 54 00 | .E.x.i.t....#T. |
| 1370:0570 | 6F 00 20 00 44 00 6F 00-73 00 00 00 2E 00 70 00 | o...D.o.s..p. |
| 1370:0580 | 45 58 49 54 54 4F 7E 31-50 49 46 20 00 1E 2B 6D | EXITTO~1PIF..+m |
| 1370:0590 | 67 25 67 25 00 00 EC 49-66 25 16 00 C7 03 00 00 | G%g%...If... |

Contents of the same directory after system is crashed are as follow:

| | | |
|---|---|---|
| 1370:0460 | 42 4C 41 43 4B 54 7E 31-42 4D 50 20 00 0F 2B 6D | BLACKT~1BMP..+m |
| 1370:0470 | 67 25 67 25 00 00 20 A0-AB 24 0D 00 B6 00 00 00 | G%g%....$... |
| 1370:0480 | 43 48 41 4E 4E 45 7E 31-53 43 52 20 00 10 2B 6D | CHANNE~1SCR..+m |
| 1370:0490 | 67 25 67 25 00 00 20 A0-AB 24 0E 00 40 48 01 00 | g%g%....$..@H.. |
| 1370:04A0 | 52 55 4E 4F 43 7E 31-54 58 54 20 00 15 2B 6D | RUNONC~1TXT..+m |
| 1370:04B0 | 67 25 67 25 00 00 16 72-65 25 14 00 B3 45 00 00 | G%g%...re%...E.. |
| 1370:04C0 | 45 58 49 54 54 4F 7E 31-50 49 46 20 00 1E 2B 6D | EXITTO~1PIF..+m |
| 1370:04D0 | 67 25 67 25 00 00 EC 49-66 25 16 00 C7 03 00 00 | G%g%...If... |

Contents of the same directory after the recovery operation of this invention are as follow:

| | | |
|---|---|---|
| 1370:0000 | 42 4C 41 43 4B 54 7E 31-42 4D 50 20 00 0F 2B 6D | BLACKT~1BMP..+m |
| 1370:0010 | 67 25 67 25 00 00 20 A0-AB 24 0D 00 B6 00 00 00 | G%g%....$... |
| 1370:0020 | 42 6E 00 20 00 53 00 61-00 76 00 0F 00 6B 65 00 | Bn..S.a.v..ke. |
| 1370:0030 | 72 00 2E 00 53 00 43 00-52 00 00 00 00 00 FF FF | r..SCR....... |
| 1370:0040 | 01 43 00 68 00 61 00 6E-00 6E 00 0F 00 6B 65 00 | .C.h.a.n.n...ke. |
| 1370:0050 | 6C 00 20 00 53 00 63 00-72 00 00 00 65 00 65 00 | l..S.c.r...e.e. |
| 1370:0060 | 43 48 41 4E 4E 45 7E 31-53 43 52 20 00 10 2B 6D | CHANNE~1SCR..+m |
| 1370:0070 | 67 25 67 25 00 00 20 A0-AB 24 0E 00 40 48 01 00 | g%g%....$..@H.. |
| 1370:0080 | 42 2E 00 74 00 78 00 74-00 00 00 0F 00 D0 FF FF | B..t.x.t... |
| 1370:0090 | FF FF FF FF FF FF FF FF-FF FF 00 00 FF FF FF FF | ............... |
| 1370:00A0 | 01 52 00 75 00 6E 00 4F-00 6E 00 0F 00 D0 63 00 | .R.u.n.O.n....c. |
| 1370:00B0 | 65 00 45 00 78 00 20 00-4C 00 00 00 6F 00 67 00 | e.E.x..L...o.g. |
| 1370:00C0 | 52 55 4E 4F 43 7E 31-54 58 54 20 00 15 2B 6D | RUNONC~1TXT..+m |
| 1370:00D0 | 67 25 67 25 00 00 16 72-65 25 14 00 B3 45 00 00 | G%g%...re%...E.. |
| 1370:00E0 | 42 69 00 66 00 00 00 00-FF-FF FF FF 0F 00 23 FF FF | Bi.f.....#.. |
| 1370:00F0 | FF FF FF FF FF FF FF FF-FF FF 00 00 FF FF FF FF | ............... |
| 1370:0100 | 01 45 00 78 00 69 00 74-00 20 00 0F 00 23 54 00 | .E.x.i.t....#T. |
| 1370:0110 | 6F 00 20 00 44 00 6F 00-73 00 00 00 2E 00 70 00 | o...D.o.s..p. |
| 1370:0120 | 45 58 49 54 54 4F 7E 31-50 49 46 20 00 1E 2B 6D | EXITTO~1PIF..+m |
| 1370:0130 | 67 25 67 25 00 00 EC 49-66 25 16 00 C7 03 00 00 | G%g%...If... |

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A method for backup and recovery of the long filename in a computer system that does not support the long filename designation, said computer system containing a logical disk partition table for storing long filename and short filename items, said method comprising the following steps:

(a) performing a long filename backup procedure by obtaining a file directory table (FDT) from a logical disk partition table, transferring and storing the long filename item and short filename item from the FDT into a long filename backup file; and (b) performing a long filename recovery procedure by obtaining the short filename of each FDT and sub-FDT, reversing the long filename backup process and writing the corresponding data of the long filename backup file back to the original FDT;

(c) wherein the long filename backup procedure comprises the sub-steps of:

searching the disk parameter block (DPB) of the partition according to the disk partition table;

storing all the long filename item and short filename item of the FDT in the current directory as a long filename backup file;

searching the FDT of the subdirectory; and storing all the long filename item and short filename item of the FDT of the subdirectory in the current subdirectory as a long filename backup file; and (d) wherein the long filename recovery procedure comprises the sub-steps of:

obtaining the disk parameter block (DPB) of the partition according to the disk partition table;

obtaining the corresponding data in all the long filename backup file according to each short filename item in the FDT of the partition, and replacing the directory's FDT with the corresponding short filename item and long filename item of the long filename backup file as a new file directory item;

searching the FDT of subdirectories; and obtaining the corresponding data in all the long filename backup file according to each short filename item in the FDT of subdirectory, and replacing the subdirectory's FDT with the corresponding short filename item and long filename item of the long filename backup file as a new file directory item.

2. The method of claim 1, wherein the corresponding data of the long filename backup file includes a short filename item and a corresponding long filename item.

3. A method for creating a long filename backup file for a computer system under an environment that does not support the long filename designation, comprising:

obtaining a file system ID (FSID) by reading the disk parameter block (DPB) data of a backup disk;

calculating the location of boot directory table (BDT) of the disk, and setting the size of the BDT including the disk capacity and cluster if the disk partition is of FAT 16 format by checking the FSID;

obtaining the start point of the BDT if the disk partition is of FAT 32 format by checking the FSID;

calculating the BDT start location; and searching all the file directory table (FDT) of the disk to create a long filename backup file in the current directory;

wherein the step of creating the long filename backup file further comprises the following sub-steps:

setting the starting directory as the current directory if the backup operation of the current directory is finished;

reading a file directory item and writing it to the long filename backup file in the current directory;

proceeding with next subdirectory in a recursive manner if the file directory item is a subdirectory; and saving the backup file under the current directory as a backup document if the file directory item is the ending item of the long filename.

4. The method of claim 1, wherein the file directory item comprises a short filename item and a corresponding long filename item.

* * * * *